March 16, 1948.     S. M. MERCIER     2,438,068
CONVEYOR SLACK TAKE-UP MECHANISM
Filed Aug. 19, 1944
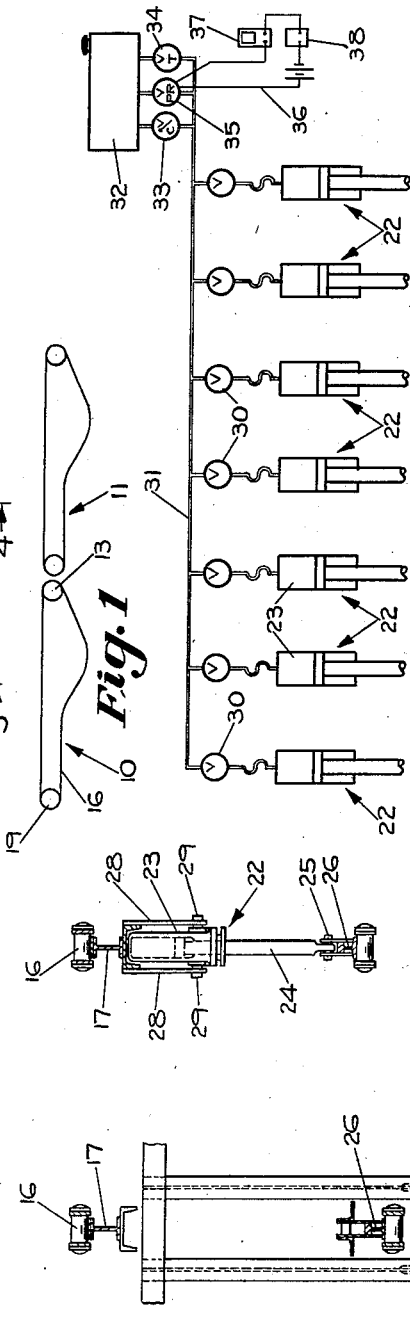
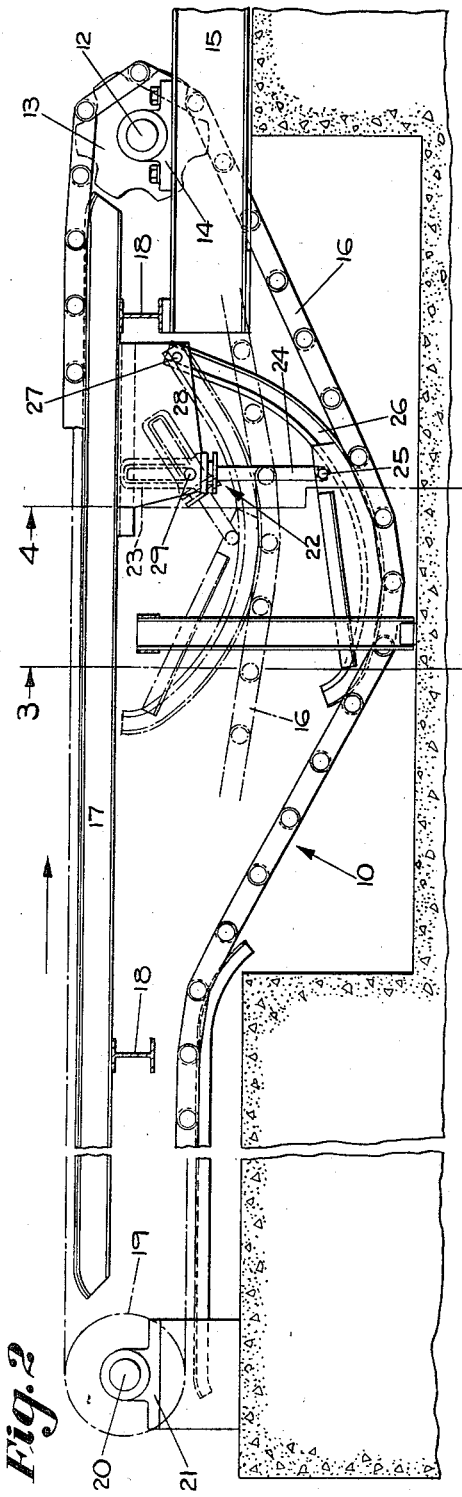
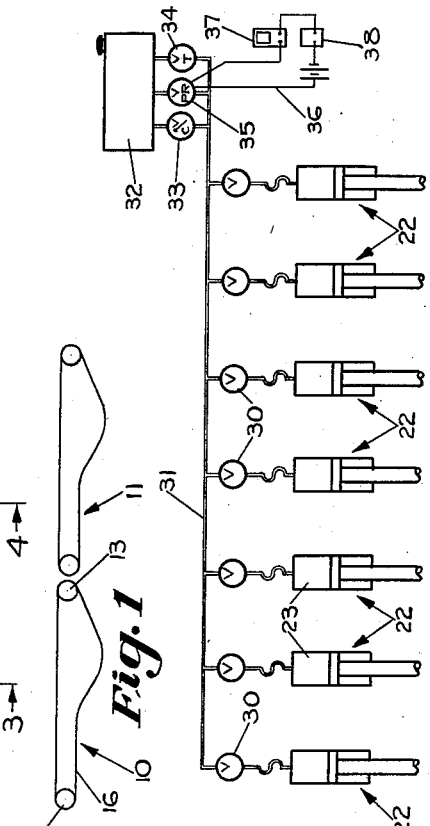
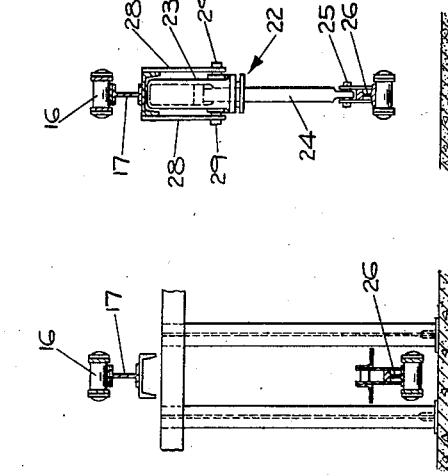
INVENTOR;
STANLEY M. MERCIER,
BY Harker H. Hittson,
ATT'Y.

Patented Mar. 16, 1948

2,438,068

UNITED STATES PATENT OFFICE 2,438,068

CONVEYOR SLACK TAKE-UP MECHANISM

Stanley M. Mercier, Bexley, Ohio, assignor, by mesne assignments, to The Jeffrey Manufacturing Company, a corporation of Ohio Application August 19, 1944, Serial No. 550,259

7 Claims. (Cl. 198—208)

This invention relates to a conveyor or a conveyor system, and an object of the invention is to provide a conveyor including a take-up mechanism which acts to maintain chain or chains of the conveyor under proper tension or, in other words, to take up the slack while providing for free movement of the take-up mechanism in one direction and only restricted or slow movement thereof in the opposite direction.

A further object of the invention is to provide a conveyor system including a plurality of endless chains each having an individual associated take-up mechanism of the character above described, each take-up mechanism including a hydraulic piston motor supplied with hydraulic fluid from a common source and in which each piston motor can move freely to expand but can contract only at a restricted rate, and in a complete aspect of my invention the hydraulic system includes a pressure relief valve operable in response to a predetermined high pressure on any take-up device and in which there may or may not be signal or control means operated by actuation of the pressure relief valve.

Other objects of the invention will appear hereinafter, the novel features and combinations being set forth in the appended claims.

In the accompanying drawings,

Fig. 1 is a diagrammatic view showing two conveyors in tandem, the conveyors preferably incorporating the features of my invention;

Fig. 2 is an enlarged elevational view of one strand of chain of one of the conveyors incorporating the features of my invention;

Fig. 3 is a transverse sectional view taken on the line 3—3 of Fig. 2, looking in the direction of the arrows;

Fig. 4 is a transverse sectional view taken on the line 4—4 of Fig. 2; and

Fig. 5 is a schematic piping diagram of the hydraulic system of my invention.

The invention herein disclosed is designed to solve a problem which was encountered in connection with the conveying of hot sheets of steel by a plurality of successive conveyors. The hot sheets of steel heat the chains of the individual conveyors and often individual chains are subject to entirely different temperatures and the temperature of any individual chain will vary appreciably from time to time, causing expansion and contraction thereof.

As an additional factor, sometimes when the conveyors were placed in operation the successive conveyors were not driven at the same rate and in some instances one conveyor was not even started at all, so that the driven conveyor tended to drive the chains of the other conveyor. This tended to produce slack in the upper or working run of the other conveyor and to throw the chain off its driving sprocket.

In Fig. 1 of the drawings I have illustrated diagrammatically two successive conveyors 10 and 11. Each of these conveyors is driven entirely independently of the other and in the particular installation wherein my invention was made, the conveyors 10 and 11 convey sheets of hot steel as above mentioned. Each conveyor 10 and 11 consists of a plurality of individual strands of chain and in the particular installation involved there were six strands of chain on each conveyor 10 and 11. Each of these chains was driven from a common drive shaft through an individual sprocket. The foot sprocket of each of the chains was mounted loosely on a common shaft and thus was individually rotatable on said shaft.

In Figs. 2, 3 and 4 of the drawings I have illustrated in detail the construction of one of the strands of chain of the conveyor 10, it being understood that in the complete conveyor there are a plurality of such strands driven from the same head shaft through individual sprockets. That is, a head shaft 12 is provided carrying six drive or head sprockets, one of which is seen at 13. The head shaft 12 is mounted in two or more bearings, one of which is seen at 14, carried on an I-beam 15.

Extending around and driven by the sprocket 13 is an endless chain 16, the upper or working strand or run of which is supported on an I-beam 17 which in turn is supported on appropriate frame members including I-beams 18.

At its rear end the chain 16 travels around a foot wheel or sprocket 19 mounted on a foot shaft 20. As previously mentioned there will be six sprockets 19 each mounted for independent rotation on the foot shaft 20. Foot shaft 20 is supported in appropriate bearings, one of which is seen at 21.

It is desirable to provide a slack take-up mechanism individual to each chain 16, which will keep it under proper tension without overloading it while providing for free expansion and contraction thereof due to changes in temperature and due to wear which take place relatively slowly. As a matter of fact, the take-up mechanism will compensate for expansion even at a rapid rate, but restricts the contraction to that at a slow rate. The take-up mechanism is duplicated for each of the chains 16 and each includes a hydraulic piston motor 22 including a cylinder 23 and a piston rod 24 extending into said cylinder. The piston rod 24 carries a piston at its upper end, and the lower end is pivoted by a pivot pin 25 to a curved pivotally mounted weighing member 26 which may be in the form of a rail pivotally attached by a pivot pin 27 to a pair of spaced-apart plates 28 forming a part of the conveyor frame. The cylinder 23 is also provided with trunnions 29 by which it is pivotally attached between the spaced plates 28.

By reference to Fig. 2 of the drawings it is obvious that the weight of the weighing member 26 will take up the slack in the chain 16 which is accumulated directly to the rear of sprocket 13 and on the return run of said chain 16.

It is, of course, desirable that the weight transmitted by the member 26 be not excessive, or it will cause undue wearing of the chain 16. At the same time it should be adequate to take up the slack in the chain 16 under all conditions or, in other words, should keep the chain 16 under proper tension. The two extreme positions in which the take-up mechanism in chain 16 may be found are illustrated in full lines and in dotted lines in Fig. 2 of the drawings.

The take-up piston motors 22 associated with the six strands of the conveyor 10 are illustrated in Fig. 5 of the drawings. The upper ends of all of the cylinders 23 are connected through individual valves 30 to a hydraulic feed line 31 which is connected with a hydraulic tank 32. The connection between the tank 32 and line 31 includes a check valve 33 which permits the hydraulic fluid to flow freely from the tank 32 to the line 31 and thus freely to any cylinder 23 whose valve 30 is open, thereby providing for free expansion of the piston motors 22. Normally, all of the valves 30 will be open, any valve 30 being operable to closed position to disconnect the associated take-up mechanism.

Also between tank 32 and feed line 31 is a variable throttle valve 34 which controls the rate at which hydraulic fluid can flow from the line 31 back into the tank 32. This therefore controls the rate of contraction of the hydraulic piston motor 22.

There is also a pressure relief valve 35 connected between the tank 32 and the feed line 31 so that in case there is an excessive pressure in line 31, caused for example by an undue or excessive load on a piston motor 22, the relief valve 35 will open and permit the fluid to flow from feed line 31 into the tank 32. If desired, a switch may also be operated by the relief valve 35 whenever it opens, to close an electric circuit 36 which may include an alarm or buzzer 37 and an operating relay 38 which may shut down the driving motor for a conveyor. The circuit 36 may be eliminated if desired.

In the operation of the system hot plates will be delivered, for example, to the conveyor 10 and by it to the conveyor 11. The endless chains 16, of which there are six in the embodiment illustrated in each of the conveyors 10 and 11, will carry the hot plates and will absorb some of the temperature thereof. This heating of the chains 16 will cause them to expand and the take-up mechanism will maintain the chains under proper tension when so expanded. As the chains 16 contract under cooling or reduced temperature, the take-up mechanism will accommodate this condition, since the hydraulic fluid can flow at a slow rate through the throttle valve 34.

Should a condition arise, for example, in which the conveyor 11 is not being driven or is being driven at a lower speed than the conveyor 10, through inadvertance, the plate or sheet conveyed by conveyor 10 might possibly drive the upper or working run of the conveyor 11. This would, of course, tend to take up the slack from the lower run at a very rapid rate and if this were permitted, it is entirely probable that the accumulation of chain on the upper run would cause the chain to jump the sprocket 13. This is prevented, however, by the snubbing action of the take-up mechanism since it can only contract at a relatively slow rate. Should a high pressure situation develop in the line 31, for example, by the extreme hard pushing of the upper run of one of the chains 16, the pressure relief valve 35 would open to relieve the undesirable pressure condition, and if the alarm system or circuit 36 is employed, this will also give a signal and/or shut off a driving motor if one is controlled by relay 38.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. A conveyor including an endless chain, slack take-up mechanism associated with said chain for taking up slack therein, said mechanism being constructed and arranged to operate to provide for free expansion and slow contraction of said chain while preventing rapid contraction thereof, said mechanism including a cylinder having a piston therein, valve means associated therewith operable to provide for free outward movement of said piston as fluid flows freely into said cylinder and restricted inward movement, and an overload relief valve operated in response to an excessive pressure of the fluid in said cylinder.

2. A conveyor including an endless chain, slack take-up mechanism associated with said chain for taking up slack therein, said mechanism being constructed and arranged to operate to provide for free expansion and slow contraction of said chain while preventing rapid contraction thereof, said mechanism including a cylinder having a piston therein, and check and high pressure relief valve means associated therewith operable to provide for free outward movement of said piston as fluid flows freely into said cylinder and restricted inward movement.

3. A conveyor including a plurality of endless chains, means for driving each of said chains together, individual slack take-up means for each chain, said take-up means each including a hydraulic piston motor, means for feeding hydraulic fluid to all of said motors to provide for their free expansion to take up slack in their associated chains, means providing for restricted contraction of each of said motors, and means responsive to an excessive pressure created by any one of said motors for relieving the pressure of the hydraulic feed means and for actuating a control device.

4. A conveyor including a plurality of endless chains, means for driving each of said chains together, individual slack take-up means for each chain, said take-up means each including a hydraulic piston motor, means for feeding hydraulic fluid to all of said motors to provide for their free expansion to take up slack in their associated chains, means providing for restricted contraction of each of said motors, and means responsive to an excessive pressure created by any one of said motors for relieving the pressure of the hydraulic feed means.

5. A conveyor including a plurality of endless chains, means for driving each of said chains together, individual slack take-up means for each chain, said take-up means each including a hydraulic piston motor, means for feeding hydraulic fluid to all of said motors to provide for their free expansion to take up slack in their associated chains, and means common to all said hydraulic piston motors providing for restricted contraction of each of said motors.

6. A conveyor including an endless chain, slack take-up mechanism associated therewith for taking up slack therein and including a fluid pressure piston motor, check valve means associated with said piston motor providing for its free expansion, throttle valve means providing for controlled contraction thereof, and valve means providing for its rapid contraction in response to excessive overload.

7. Apparatus of the class described, including endless conveyor means, take-up means therefor including an expansible fluid motor having a piston and cylinder and operable upon expansion thereof to take up increased slack in said conveyor means, means for controlling flow of fluid to and from said cylinder as the piston moves relative thereto including a check valve providing for free expansion of said piston and cylinder while preventing free contraction thereof, and a pressure relief valve adapted to open and provide for contraction of said piston and cylinder in response to a predetermined pressure of said fluid caused by said conveyor means tending to reduce the apparent amount of slack.

STANLEY M. MERCIER.

REFERENCES CITED

The following references are of record in the file of this patent:

UNITED STATES PATENTS

| Number | Name | Date |
|---|---|---|
| 1,663,344 | Lennard | Mar. 20, 1928 |
| 2,191,946 | Weller | Feb. 27, 1940 |